United States Patent
Cherukuri

(10) Patent No.: US 6,473,935 B1
(45) Date of Patent: Nov. 5, 2002

(54) RETRACTABLE ROLLER MECHANISM

(76) Inventor: Hema Cherukuri, 9212 E. Arbor Cir. #1, Englewood, CO (US) 80111

( * ) Notice: Subject to any disclaimer, the term of this patent is extended or adjusted under 35 U.S.C. 154(b) by 0 days.

(21) Appl. No.: 09/681,684

(22) Filed: May 21, 2001

(51) Int. Cl.[7] ............................................. B60B 33/06
(52) U.S. Cl. ........................... 16/33; 16/42 R; 16/44; 248/188.9
(58) Field of Search ................... 16/32, 33, 35 D, 16/43, 44, 42 R, 91; 248/188.8, 188.9

(56) References Cited

U.S. PATENT DOCUMENTS

| | | |
|---|---|---|
| 1,749,751 A | 3/1930 | Bergsten |
| 1,873,347 A | 8/1932 | Smart |
| 2,025,448 A | 12/1935 | Hebbinghaus |
| 2,059,420 A | 11/1936 | Ward, Jr. |
| 2,709,827 A | 6/1955 | Volz |
| 2,767,420 A | 10/1956 | Riccio |
| 2,770,831 A | 11/1956 | Angelica et al. |
| 2,808,607 A | 10/1957 | Urso |
| 3,349,425 A | 10/1967 | Rabelos |
| 3,699,609 A * | 10/1972 | Spatz ............................ 16/44 |
| 4,077,086 A | 3/1978 | Butler |
| 4,103,391 A * | 8/1978 | Thomsen ........................ 16/33 |
| 4,166,516 A * | 9/1979 | Thurmond, Jr. ................. 16/19 |
| 5,001,808 A | 3/1991 | Chung |
| 5,259,088 A * | 11/1993 | Yang ............................. 16/33 |

OTHER PUBLICATIONS

Hafele, Catalog cut for Rolling Star Casters, at least as early as Oct. 16, 2000, page identifier 6.14, tch 99, 898, catalog No. 661.03.026, United States Publication.

* cited by examiner

*Primary Examiner*—Chuck Y. Mah
(74) *Attorney, Agent, or Firm*—Roger A. Jackson

(57) ABSTRACT

An improved retractable roller mechanism 20 and method for statically supporting an item 42 upon a support surface 40 in an inoperative state and supporting the item 42 to roll along the support surface 40 in an operative state. The retractable roller mechanism 20 includes a housing 22, a roller frame 24 that is slideably engaged with the housing 22, a spring 30, and a roller 28. The roller frame 24 has reciprocative movement relative to the housing 22, such that the frame 24 has an inoperative position state where the frame 24 is retracted allowing the housing 22 to rest on and statically contact the support surface 40 and an operative position state where the frame 24 is extended such that the housing 22 is not in contact with the support surface 40 allowing the item 42 to roll along the support surface 40.

15 Claims, 4 Drawing Sheets

RETRACTABLE ROLLER MECHANISM

TECHNICAL FIELD

The present invention generally relates to mechanisms that act to support an item while at the same time allowing the item to move across a support surface. In particular, the present invention relates to using a retractable roller mechanism that provides a static support upon the support surface when the item, such as an article of furniture has a relatively high force towards the support surface causing the roller mechanism to retract, when the item has a relatively lower force towards the support surface the roller mechanism automatically separates the static support from the support surface thereby allowing a roller to freely move the item along the support surface.

BACKGROUND OF INVENTION

There has long been a desire to move large, bulky, and unwieldy items easily across a support surface with a minimum of effort while at the same time having the item not be unstable along the support surface during the times when it is desired that the item not to be easily moved across the support surface. This desire to have a roller mechanism or castor mechanism have two position states, being a first or operative state where the roller serves to allow the item to be easily moved along the support surface and a second or inoperative state wherein the roller becomes inoperative not allowing the item to be easily moved along the support surface, is well recognized in the prior art.

Previous approaches to this problem have often resulted in complex caster mechanisms that required the item to be lifted in order to actuate the caster into the previously mentioned first operating state from the second operating state or vice versa. The problem with this approach was that it required the item to be lifted, which is unsatisfactory because the desire to avoid lifting the item is the reason for providing roller mechanisms in the first place. Even if a particular item is not all that heavy, the size and bulk of the item usually makes it difficult for an individual to simultaneously lift the item and operate the roller mechanism to change the operating state, in addition most items have multiple roller mechanisms which require a single individual to lift the item multiple times at different locations. The aforementioned complex caster mechanisms have sometimes included jacks, in which the item can be raised and lowered to effectuate the roller mechanism changing its operating state, however, these mechanisms were still difficult to use for two reasons. First, if the item was located in a confined area or space, the jack mechanism was difficult to access, and secondly, the location of the jack, typically being on the bottom of the item could be difficult for an individual to be able to reach to the jack mechanism while simultaneously attempting to lift the item. Other approaches to this problem have included using a spherical roller mechanism that fits inside a mating socket, wherein the socket is retractable into a separate housing to provide both static support on the support surface when the spherical roller and socket assembly are retracted into the housing and when the spherical roller and socket assembly are extended from the housing allowing the item to be moved along the support surface. The problem with the spherical roller is that it operated at a close clearance with the socket assembly and was prone to ingesting foreign material into this close clearance, such as carpet fibers, when the spherical roller was moving across the support surface which caused a high degree of a frictional resistance to the spherical roller rotating. This resistance to rotation by the spherical roller made it difficult to move the item along the support surface. Another problem with the spherical roller was that it had a small contact area with the support surface which increased the unit loading that the spherical roller placed upon the support surface from the weight of the item, this in turn increased the likelihood of damage to the support surface from the spherical roller.

There remains a need for a retractable roller mechanism that supports an item while providing the two desired position states of being operative to allow the item to move along a support surface and being inoperative to statically support the item upon the support surface, without the need for an individual to lift the item or operate the mechanism while at the same time being adaptable to a varying support surface types, minimizing damage to the support surface, and being a simple to construct.

SUMMARY OF INVENTION

It is an object of the present invention to provide an improved retractable roller mechanism that can be operated conveniently by the normal forces that are applied to the item on which the roller mechanism is mounted, without the requirement of an individual having to access the roller mechanism itself.

It is a further object of the present invention to provide a retractable roller mechanism wherein the roller is automatically retracted into and and in an inoperative state by a exerting a force that is greater than the normal weight of the item from the item to the support surface, allowing the item to assume a static or stationary position for the period of time in which the force is continuously applied.

Still another object of the present invention is to provide a retractable roller mechanism wherein the roller is automatically placed into an operative state, and permitting free movement of the item along the support surface when the force from the item to the support surface is equal to the normal weight of the item.

Yet another object of the present invention is to provide a retractable roller mechanism of simple non castor construction that allows only bi-directional movement of the item while the roller mechanism is in the operative state.

It is another object of the presence invention to provide a retractable roller mechanism that while in an operative state has a roller that is adaptable to varying support surface types.

It is yet another object of the present invention to provide a retractable roller mechanism that while in an operative state or in inoperative state will result in none or minimal damage to the support surface.

It is further yet another object of the present invention to provide a retractable roller mechanism that is constructed of a minimum number of parts for ease of manufacture and lower unit costs.

The present invention is an improved retractable roller mechanism that statically supports an item upon a support surface in an inoperative state and supports the item to roll along the support surface in an operative state. Broadly, the mechanism includes a housing with a symmetrical axis, a roller frame that is slidably engaged with the housing for reciprocative movement relative to the housing, a spring, and a roller. The frame has an inoperative position state wherein the frame is retracted such that the housing rests on an statically contacts the support surface while supporting the item, the frame also has an operative position state provided by the spring bias wherein the frame is extended from the inoperative position state. The roller is rotatably mounted in the frame and is disposed to roll along the support surface when the frame is in the operative position state such that the housing is not in contact with support surface allowing the item to roll along the support surface. The retractable roller mechanism in the operative state allows only bi-directional movement along the support surface, the frame and roller are not castered with the roller having a rotational axis that is perpendicular to and intersects the housing axis.

These and other objects of the present invention will become more readily appreciated and understood from a consideration of the following detailed description of the preferred embodiment of the present invention when taken together with the accompanying drawings, in which:

REFERENCE NUMBERS IN DRAWINGS

Figure 1:
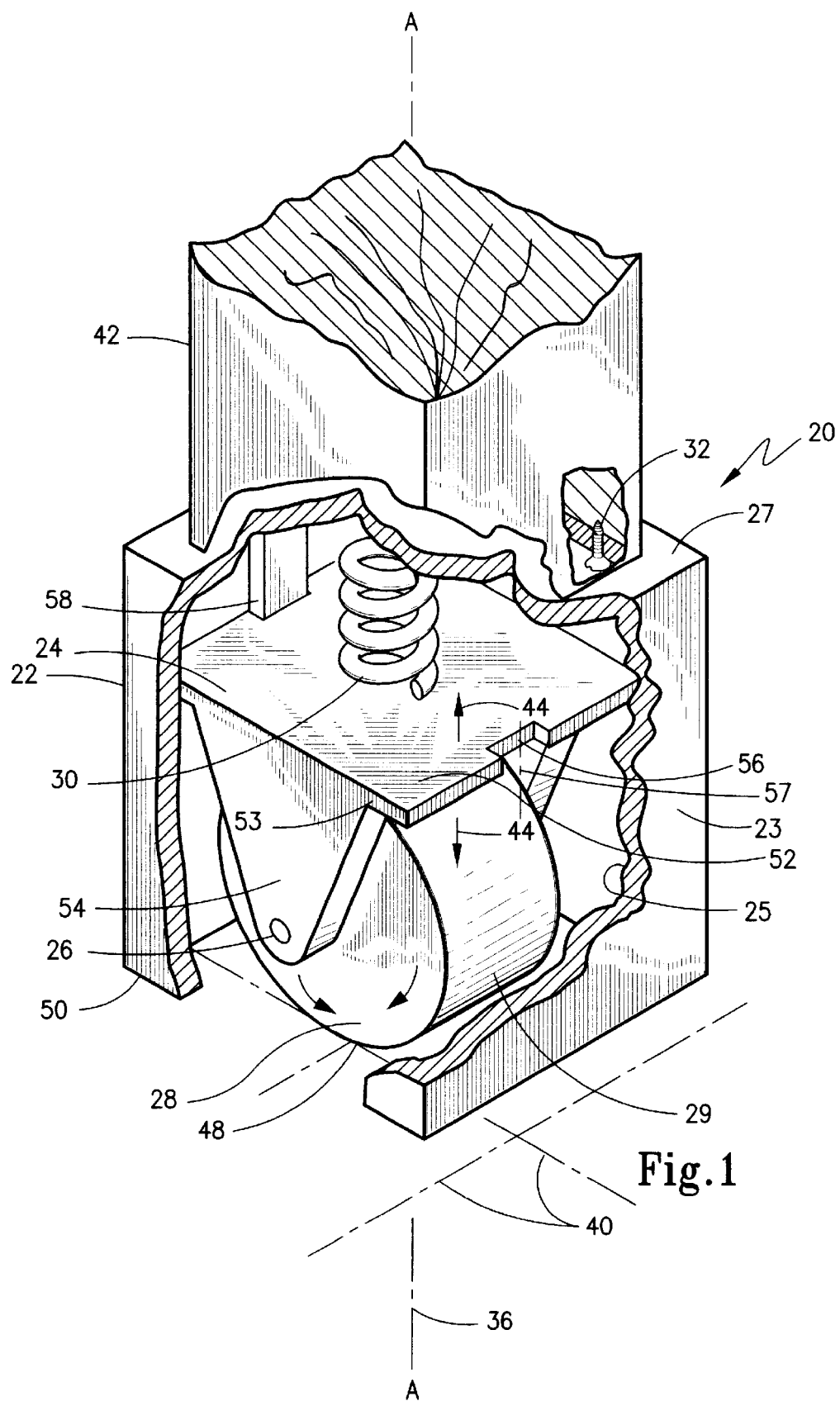
FIG. 1 is a perspective view of the preferred embodiment of the retractable roller mechanism showing the mechanism in an operative state on the support surface, with the mechanism attached to a furniture leg.

20 Retractable roller mechanism assembly
22 Housing
23 Surrounding sidewall of housing
24 Frame, roller
25 Interior surface of sidewall of housing
26 Axle
27 Base of housing
28 Roller
29 Outer periphery of roller
30 Spring
32 Fastener, mounting from roller mechanism assembly to item
34 Rentention Shoulder on housing
36 Axis, housing, A—A
38 Spring constant, K
40 Surface, support
42 Item supported
44 Reciprocating movement of frame in relation to housing
46 Rotational axis, B—B
48 Contact area on support surface, roller
50 Contact area on support surface, housing
52 Head portion of bifurcated bracket for frame
53 Head periphery of bifurcated bracket for frame
54 Arm portion of bifurcated bracket for frame
56 Channel of head portion of a bifurcated bracket for frame
57 Channel axis
58 Rib of housing interior sidewall

DETAILED DESCRIPTION

The present invention is an improved retractable roller mechanism that statically supports an item upon a support surface in an inoperative state and supports the item to roll along the support surface in an operative state. Broadly, the mechanism includes a housing with a symmetrical axis, a roller frame that is slidably engaged with the housing for reciprocative movement relative to the housing, a spring, and a roller. The frame has an inoperative position state when the retractable roller mechanism experiences a weight greater than that of the item at which point the frame is retracted such that the housing rests on and statically contacts the support surface while supporting the item, the frame also has an operative position state provided by the spring bias wherein the frame is extended from the inoperative position state upon the weight of the supported item only. The roller is rotatably mounted in the frame and is disposed to roll along the support surface when the frame is in the operative position state such that the housing is not in contact with support surface allowing the item to roll along the support surface. The retractable roller mechanism in the operative state allows only bi-directional movement along the support surface, the frame and roller are not castered with the roller having a rotational axis that is perpendicular to and intersects the housing axis.

With initial reference to FIG. 1, a perspective view is shown of the preferred embodiment of the retractable roller mechanism 20 showing the mechanism in an operative state on the support surface 40, with the mechanism 20 adapted to be attached to an item 42 to be supported such as an article of furniture. The housing 22 includes a base 27, a surrounding sidewall 23 that extends from the base 27 towards the support surface 40, the surrounding sidewall 23 then defines a housing 22 interior, which also includes the interior surface of the sidewall 25. The base 27 on the side opposite of the housing interior is adapted to attach to item 42 that is to be supported. Although a fastener 32 is shown to attach the supported item 42 to the base portion 27 of the housing 22, many other methods of attachment could be used also such as adhesives, interlocking fits, or any other equivalent means of attachment suitable to accommodate the given load conditions. The fastener can be constructed of any suitable steel or plastic adequate for the loading conditions between the item 42 and the retractable roller mechanism 20. The materials of construction for the housing 22 are prefeably an injected plastic type material for high volume and high quality, alternativly a fabricated material such as metal could be used for lower production volumes, any other equivalent material of construction would be acceptable for the required loading and operating conditions. The housing 22 is shown broken away to expose the roller frame 24, the roller 28, the axle 26, the spring 30, the rib 58, the channel 56, and the fastener 32. As the mechanism 20 is shown being in the operative state the drawing shows that the housing 22, or more specifically the contact area of the housing 50 is separated from the support surface 40 which in turn allows the mechanism 20 to roll along the support surface 40 while supporting the item 42.

Looking in detail at the roller 28 it can be seen that the roller 28 has an outer periphery 29 that comes into contact with the support surface 40, where a contact area 48 is formed against the support surface 40. This contact area 48 would support the weight of the mechanism 20 and the item supported 42, being the situation where the spring 30 extends against the head portion 52 of the roller frame 24 to extend the frame 24, indicated by reciprocal motion arrows 44, resulting in the operative position state for the frame 24. Alternatively, frame 24 can be constructed of a bifurcated bracket that straddles the roller 28, the bifurcated bracket preferably includes a head portion 52 that terminates in two to arm portions 54 that straddle the roller 28. The roller 28 could also be constructed as a wheel that rotates about the axle 26 as shown by the directional arrows corresponding to the mechanism 20 moving along the support surface 40 in the operative state. The roller 28 can be constructed of a hard or soft material such as rubber, steel, or plastic, however, on an alternative basis the outer periphery 29 of the roller could be constructed of a deformable material to be able to control the area of the contact 48 that the outer periphery 29 of the roller 28 makes against the support surface 40 while the mechanism 20 is in the operative state. As an alternative, the frame 24 as a bifurcated bracket is constructed of a head portion 52 that has an outer periphery 53 being where a channel 56 is located. The channel 56 has an axis 57 that is located parallel to the housing axis 36, the channel 56 is shown slideably engaged with a rib 58 that is disposed on the interior surface 25 of the surrounding sidewall 23 of the housing 22. The slidable engagement between the channel 56 and the rib 58 operates on an axis that is parallel to the housing access 36, this slidable engagement acts to guide the reciprocal motion 44 of the frame 24 in relation to the housing 22. This is as compared to using the interior sidewall 25 or another portion of the housing 22 being in slidable engagement with the frame 24 to guide the reciprocal motion 44 of the frame 24 in relation to the housing 22 without the rib 58 and channel 56. Thus, use of the rib 58 and channel 56 is optional depending upon manufacturing considerations. Returning to the frame 24 and moving from the head portion 52, two arms 54 extend to straddle the roller 28, the arms 54 terminate to support the axle 26 that the roller 28 is rotatably mounted to. The materials of construction of the frame 24 and axle 26 are prefeably an injected plastic type material for high volume and high quality, alternativly a fabricated material such as metal could be used for lower production volumes, any other equivalent material of construction would be acceptable for the required loading and operating conditions.

Figure 2:
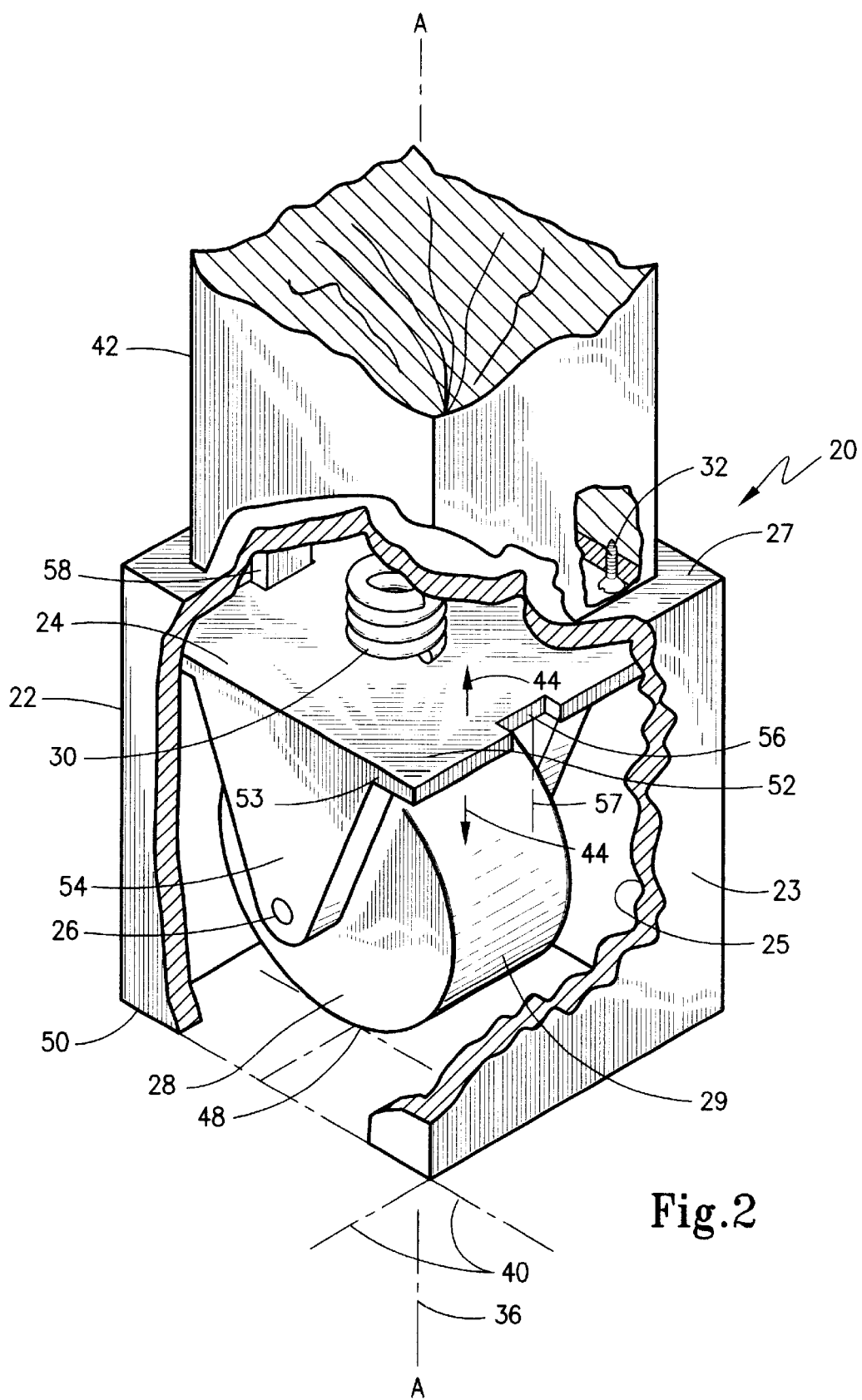
FIG. 2 is a perspective view of the preferred embodiment of the retractable roller mechanism showing the roller mechanism in an inoperative or retracted state on the support surface, with the mechanism attached to a furniture leg.

Turning now to FIG. 2 a perspective view is shown of the preferred embodiment of the retractable roller mechanism 20 showing the roller mechanism 20 in an inoperative state with the housing 22 resting on and statically contacting the support surface 40. The only difference between FIG. 1 and FIG. 2 is the fact that FIG. 1 shows the retractable roller mechanism 20 in an operative state being able to roll along the support surface the 40 and FIG. 2 shows the retractable roller mechanism 20 in an inoperative state wherein item 42 is supported statically upon the support surface 40.

The spring 30 is shown compressed due to the additional weight acting towards the support surface 40 from item 42 that is greater than the item 42 weight alone, resulting in compression of spring 30, which in turn causes the frame 24 to move 44 relative to the housing 22, retracting the frame 24 into the housing 22 which results in the housing contact area 50 resting upon and statically contacting the support surface 40. The spring 30 has a specific spring rate constant "K" defined in the units of force per unit distance that allows the spring to extend as shown in FIG. 1 when the retractable roller mechanism 20 is supporting only the weight of item 42 resulting in the mechanism 20 being in the operative state. In addition, when the weight of the item 42 is increased such as the situation where item 42 is an article of furniture and a person would be seated in the article of furniture this increasing the weight of item 42 that causes the spring 30 to compress resulting in the mechanism being in the inoperative state. The spring 30 extension corresponds to frame 24 extending resulting in the contact area 50 of the housing 22 separating from the support surface 40 being the situation FIG. 1. Returning to FIG. 2, as the weight of item 42 is increased, spring 30 compresses coinciding with the frame 24 retracting in the housing 22 allowing the contact area of the housing 50 to rest upon and statically contact the support surface 40. The actual value of the spring rate constant "K" would vary with the weight of item 42 and the contemplated increase in weight of item 42 when it is desired that the retractable roller mechanism 20 be in the inoperative state or provide static support upon the support surface 40. If item 42 were relatively heavy in weight a higher value of the spring 30 constant "K" would be required and conversely if item 42 was relatively light in weight a lower value of the spring 30 constant "K" would be required. Materials of construction for the spring 30 are to be conventional spring materials that have a high elasticity and can accommodate the required spring constant "K". The preferred construction of the spring 30 is to be a coil spring, however, an alternate spring construction would be acceptable, such as a leaf spring, a wavy spring, a belleville spring, or an equivalent spring construction as long as the required a spring constant "K" was achieved.

The roller contact area 48 that is statically resting upon the support surface 40 remains substantially constant between the retractable roller mechanism 20 operative state and the inoperative state as the loading that generates the roller contact area 48 is based upon the spring 30 constant "K" which changes very little as the spring is compressed due to the increased weight of the item 42 in the inoperative state. This is because as item 42 increases its weight even if the weight increase of item 42 is highly significant this additional loading towards the support surface 40 will be carried by the contact area 50 of the housing 22 into the support surface 40 and will not be transmitted into the contact area 48 of the roller 28. However, it is important in order not to damage the support surface 40 that either the contact area loading 48 of the roller 28, with the contact area loading being defined in the units of force per unit area not be higher than the contact area 50 loading of the housing 22. Typically the contact area 50 of the housing 22 will be a larger area than the contact area 48 of the roller 28, with the reason for this being that when the retractable roller mechanism 20 is in the inoperative state and statically contacting the support surface 40 with contact area 50, there is a higher weight loading specifically from the added weight of item 42. When the retractable roller mechanism 20 is in the operative state and resting upon the roller contact area 48, the only weight is the weight of item 42 which of necessity will be less than in the inoperative state with weight added to item 42. There is a slight added dynamic loading component related to contact area 48 when the retractable roller mechanism 20 is in the operative state and for this reason it is preferred that the unit loading defined as force per unit area of contact area 48 should be equal to or less than the unit loading for contact area 50. Contact area 48 can be controlled by the size of the roller 28 or wheel through diameter and/or width, and the materials of construction whose specific deformation characteristics exist on the periphery 29 of the roller 28. Contact area 50 can be controlled by the thickness of the sidewall 23 and/or the overall size of the housing 22.

As in FIG. 1, FIG. 2 shows the frame 24 that includes the head portion 52, an outer periphery of the head portion 53 where the channel 56 is located, and two arms 54 that straddle the roller 28. The arms 54 support the axle 26 that the roller 28 is rotatably mounted upon. The channel 56 has an axis 57 that is parallel to the housing axis 36, with the channel 56 being slidably engaged with the rib 58, the slidable engagement between the channel 56 in the rib 58 acts as a guide for the reciprocated movement 44 of the frame 24. The housing 22 is constructed of a base 27 with a surrounding sidewall 23 that extends from the base 27 towards the support surface 40 to form a housing interior with the interior surface of the sidewall 25. Also a fastener 32 is shown to attach the item 42 to the base 27.

Figure 3:
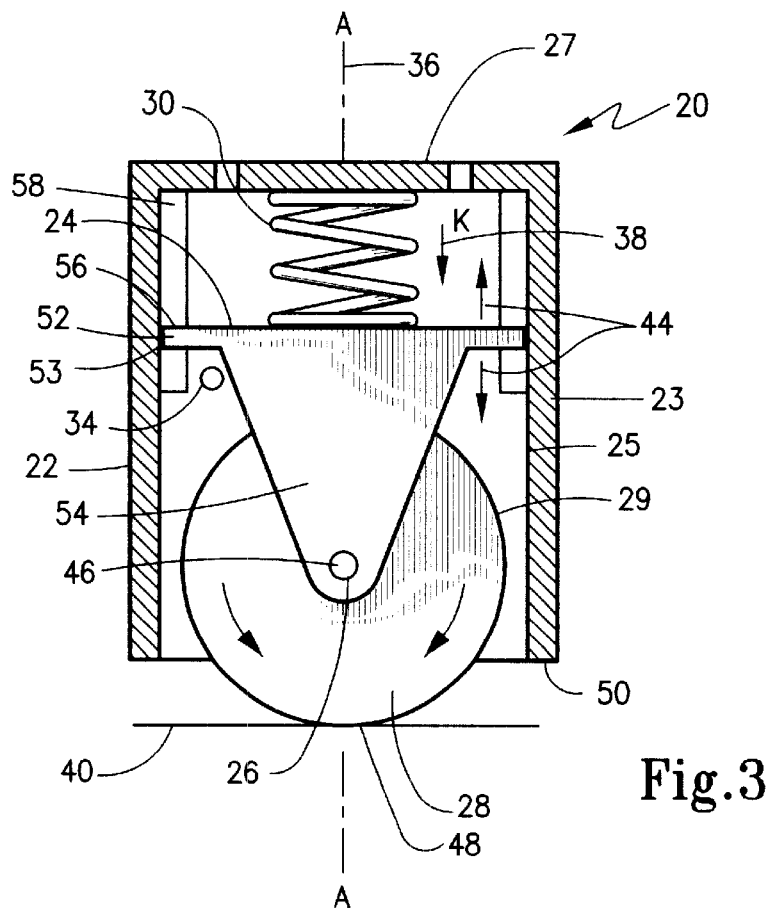
FIG. 3 is a side view cut-away section of the preferred embodiment of the retractable roller mechanism showing the mechanism in an operative state on the support surface.
Figure 4:
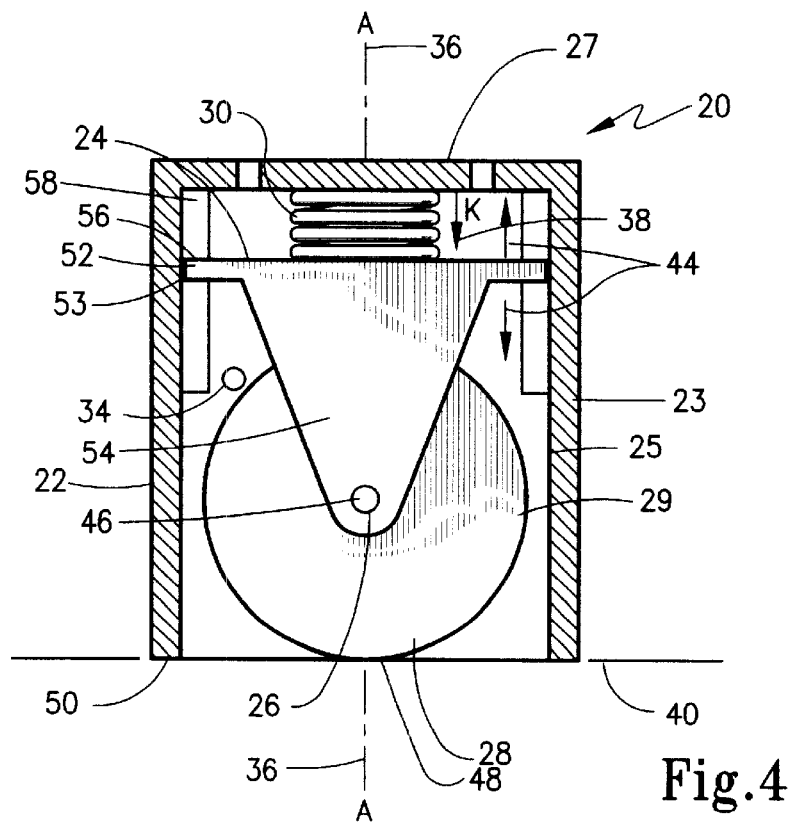
FIG. 4 is a side view cutaway section of the preferred embodiment of the retractable roller mechanism showing the mechanism in an inoperative or retracted state on the support surface.

Looking to FIGS. 3 and 4 a side view cutaway section is shown of the preferred embodiment of the retractable roller mechanism 20 showing the mechanism 20 in an operative state on the support surface 40 for FIG. 3 and the inoperative state for FIG. 4. Contact area 48 on the roller periphery 29 of the roller 28 is shown with a roller 28 being rotatably connected around the axle 26 coinciding with the rotational axis 46. Features of the operative state of the retractable roller mechanism 20 shown in FIG. 3 include the housing contact area 50 being separated from the support surface 40 thereby allowing the roller 28 to move along the support surface 40 due to the spring 30 extension causing relative movement between the frame 24 and the housing 22. It is important to note the relationship between the rotational axis 46 and the housing axis 36, as these two axes intersect each other in a perpendicular manner. What this results in, is that the roller 28 as it rotates about the rotational axis 46 has no caster in relation to the housing 22, this limits the movement of the retractable roller mechanism 22 to being by bi-directional along the support surface 40. The feature of not having any caster of the roller 28 in relation to the housing 22 eliminates a requirement for the frame 24 to swivel or pivot within the housing 22. Thus, in the preferred embodiment of the retractable roller mechanism 20 the movement of the frame 24 within the housing 22 is limited to reciprocated movement 44 that acts to define the operative and inoperative position states of frame 24 as respectively shown in FIGS. 3 and 4.

A unique feature shown in FIGS. 3 and 4 is the retention shoulder 34 that acts to limit to the extension movement of frame 24 in the operative position state in FIG. 3. As shown, the retention shoulder 34 has not contacted the frame 24 as the frame 24 extension movement is limited by contact with the roller 28 and the support surface 40 at contact area 48. However, in the event that the retractable roller mechanism 20 is suspended above the support surface 40 at a significant distance the retention shoulder 34 will prevent the frame 24 from completely extending out of the housing 22 with the spring 30.

The spring 30 constant "K" is given in force per unit distance and is shown as "K" 38, this delineates the direction of force that the spring 30 exerts against the frame 24 in biasing the frame 24 toward the operative position state in FIG. 3. The spring 30 is retained by the base portion 27 of the housing 22 while the surrounding sidewall 23 that extends from the base portion 27 towards the support surface 40 supports the reciprocative movement 44 the slidable engagement of the frame 24 and the housing 22. This slidable engagement is accomplished by use of the outer periphery 53 of the head portion 52 of the frame 24 and the interior surface of the sidewall 25. The outer periphery 53 also extends to the arm portion 54 of the frame 24 that supports the axle 26 of the roller 28. Alternatively, the frame 24 can be guided in its reciprocated movement 44 by the slidable engagement of a rib 58 and channel 56 as shown in more detail in FIGS. 1 and 2.

Figures 5, 6, 7:
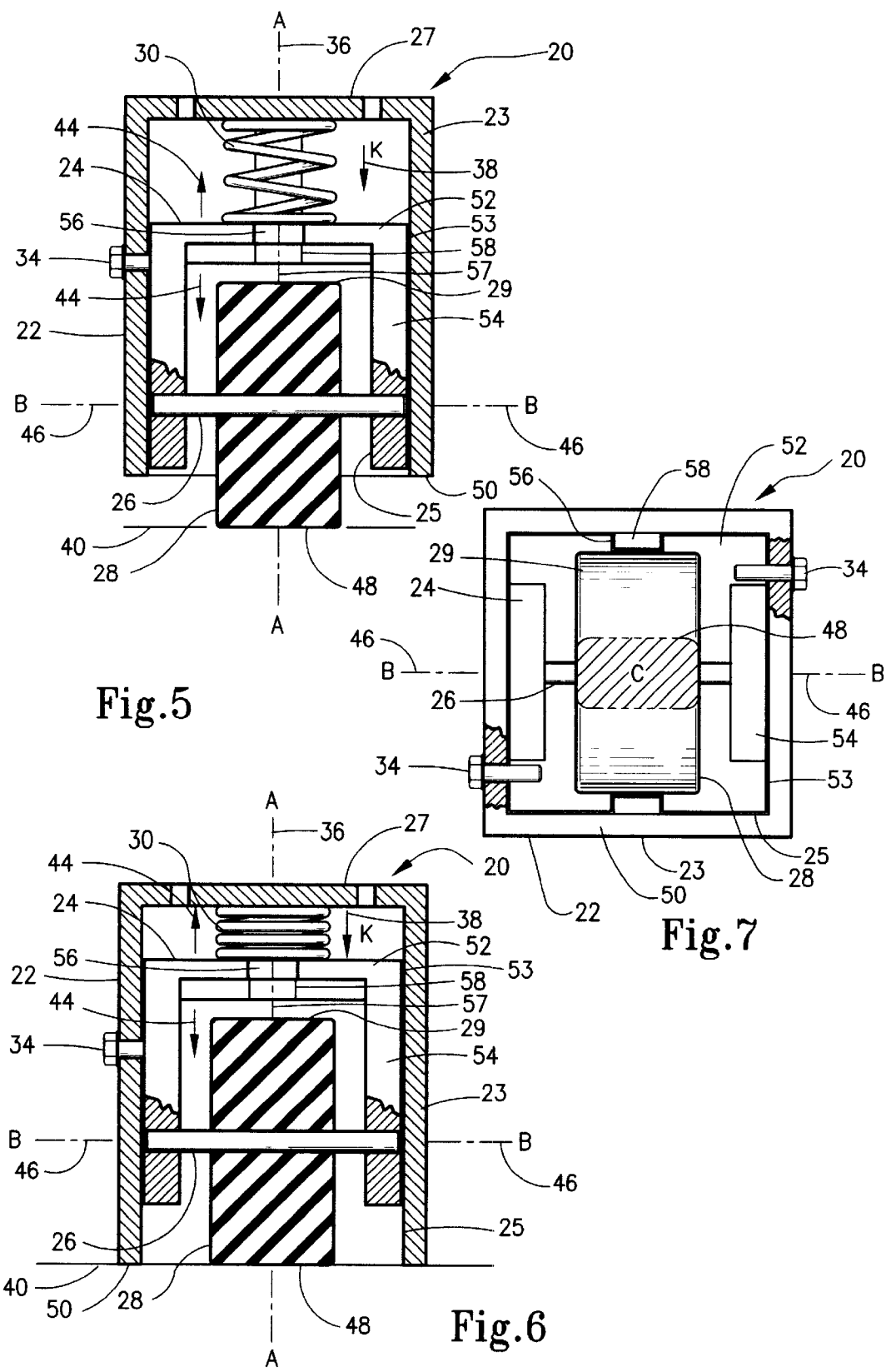
FIG. 5 is an end view cutaway section of the preferred embodiment of the retractable roller mechanism in an operative state on the support surface.
FIG. 6 is an end view cutaway section of the preferred embodiment of the retractable roller mechanism in an inoperative or retracted state on the support surface.
FIG. 7 is a view from the support surface side of the preferred embodiment of the retractable roller mechanism.

Turning to FIGS. 5 and 6, an end view cutaway section is shown of the preferred embodiment of the retractable roller mechanism 20 showing the mechanism 20 in an operative state on the support surface 40 for FIG. 5 and the inoperative state for FIG. 6. Contact area 48 on the roller periphery 29 of the roller 28 is shown with a roller 28 being rotatably connected around the axle 26 being the rotational axis 46. Features of the operative state of the retractable roller mechanism 20 shown in FIG. 5 include the housing contact area 50 being separated from the support surface 40 thereby allowing the roller 28 to move along the support surface 40 due to the spring 30 extension causing relative movement between the frame 24 and the housing 22. It is important to note the relationship between the rotational axis 46 and the housing axis 36, as these two axes intersect each other in a perpendicular manner. What this results in, is that the roller 28 as it rotates about the rotational axis 46 has no caster in relation to the housing 22, this limits the movement of the retractable roller mechanism 20 to being only bi-directional along the support surface 40. The feature of not having any caster of the roller 28 in relation to the housing 22 eliminates a requirement for the frame 24 to swivel or pivot within the housing 22. Thus, in the preferred embodiment of the retractable roller mechanism 20 the movement of the frame 24 within the housing 22 is limited to reciprocated movement 44 that acts to define the operative and inoperative position states of frame 24 as respectively shown in FIGS. 5 and 6.

A unique feature shown in FIGS. 5 and 6 is the retention shoulder 34 that acts to limit to the extension movement of the frame 24 in the operative position state in FIG. 5. As shown, the retention shoulder 34 has not contacted the frame 24 as the frame 24 extension movement is limited by contact with the roller 28 and the support surface 40 at contact area 48. However, in the event that the retractable roller mechanism 20 is suspended above the support surface 40 at a significant distance, the retention shoulder 34 will prevent the frame 24 from completely extending out of the housing 22 with the spring 30.

The spring 30 constant "K" is given in force per unit distance is shown as "K" 38, this delineates the direction of force that the spring 30 exerts against the frame 24 in biasing the frame 24 toward the operative position state in FIG. 5. The spring 30 is retained by the base portion 27 of the housing 22 while the surrounding sidewall 23 that extends from the base portion 27 towards the support surface 40 supports the reciprocative movement 44 of the slidable engagement of the frame 24 and the housing 22. This slidable engagement is accomplished by use of the outer periphery 53 of the head portion 52 of the frame 24 and the interior surface of the sidewall 25. The outer periphery 53 also extends to the arm portion 54 of the frame 24 that supports the axle 26 of the roller 28. Alternatively, the frame 24 can be guided in its reciprocated movement 44 along channel axis 57 that is parallel to housing axis 36 by the slidable engagement of a rib 58 and channel 56 as shown in more detail in FIGS. 1 and 2.

Finally turning to FIG. 7 a view is shown from the support surface side of the preferred embodiment of the retractable roller mechanism 20. Contact area 48 delineated as "C" on the roller periphery 29 of the roller 28 is shown with a roller 28 being rotatably connected around the axle 26 being with the roller 28 rotation about the rotational axis 46. The housing in this view is shown by the surrounding sidewall 23 that terminates in the contact area 50, housing contact area 50 has a larger contact area than the roller contact area 48 for the reason that the force loading from the item supported 42 (not shown) in the inoperative state can be multiples of only the item 42 weight alone supported loading in the operative state. For the unit loading, being defined as force per unit area to be equal between the roller contact area 48 and housing contact area 50, or with the roller contact area 48 unit loading less than the housing contact area 50 unit loading. The roller contact area 48 is adjusted by the deformation characteristics of the material of the roller periphery 29, or diameter and/or width of the roller 28 or any combination of these modifications. The housing contact area 50 is adjusted by the sidewall 23 thickness and overall size of the housing 22. The purpose of this contact area unit loading relationship is to minimize potential damage to the support surface when the retractable roller mechanism 20 is then either the operative state or in the inoperative state.

The retention shoulder 34 is disposed in the housing 22 and acts to limit to the extension movement of the frame 24 in the event that the retractable roller mechanism 20 is suspended above the support surface at a significant distance, in which the retention shoulder 34 will prevent the frame 24 from completely extending out of the housing 22 with the spring 30 (not shown). The retention shoulder 34 as shown is in the configuration of a fastener however, the retention shoulder 34 could assume any number of configurations as long as a reciprocative movement limit against the frame 24 from the housing 22 is effectuated. Alternative configurations of the retention shoulder 34 could be a protrusion from the interior surface of the sidewall 25 that is either attached to the sidewall 25 or an integral part of the sidewall 25, a dowel, pin, rivet, or any other equivalent "stop" for limiting the frame 24 relative movement in the housing 22.

The slidable engagement between the housing 22 and the frame 24 is accomplished by use of the outer periphery 53 of the head portion 52 of the frame 24 and the interior surface of the sidewall 25. The outer periphery 53 also extends to the arm portion 54 of the frame 24 that supports the axle 26 of the roller 28. Alternatively, the frame 24 can be guided in its reciprocated movement 44 (not shown) by the slidable engagement of the rib 58 and channel 56 as shown in more detail in FIGS. 1 and 2.

Method of Using the Preferred Embodiment

Referring to FIGS. 1 and 2 for the preferred embodiment, a method is given for using the retractable roller mechanism 20 for statically supporting an item 42 upon the support surface 40 with the retractable roller mechanism 20 in an inoperative state and supporting the item 42 to roll along the support surface by use of the retractable roller mechanism 20 in an operative state. Item 42 will typically be adpated toward having two operative states being desired by the individual in using the item 42, necessitating that the item 42 have its weight increased in a static position. The first state or operative state is where it is desired to have the item 42 be moveable along a support surface 40 to a desired position, where an an individual provides the motive force to move the item across the support surface 40, once the desired position is obtained then the individual will quit providing a motive force to item 42, allowing item 42 to be statically positioned at its desired location. The second state or the inoperative state is where an additional weight is placed in the item 42, such as an individual sitting in an article furniture which will cause the roller 28 to retract into the housing 22, with the housing 22 than resting upon and statically contacting the support surface 40.

A first step is to provide the item 42 to be supported, the item 42 can be an article of furniture or any equivalent item that is bulky or unwieldly to move into a desired position, wherein to the weight of item 42 will be increased once item 42 is located in its desired static position. A second step is to provide the retractable roller mechanism 20 the to support the item 42, the retractable roller mechanism 20 includes a housing 22, a roller frame 24, a roller 28, with the roller frame 24 being slideably engaged with the housing 22, and also includes a spring to bias and extend the roller frame 24 in relation to the housing 22 to the operative position state. In the operative position state the roller 28 that is rotatably mounted in the frame 24 is in contact 48 with the support surface 40, with the housing 22 being separated from the support surface 40. A third step is to adapt the retractable roller mechanism 22 support the item 42, this can be done a number of ways from using fasteners 32, or using an adhesive, or another interlocking type of arrangement such that there is a sufficient attachment between the retractable roller mechanism 20 and the item 42 to be supported. Moving to the fourth step which requires that the item 42 be putting a force onto the retractable roller mechanism 20 equal to the item 42 individual weight, which will result in the retractable roller mechanism 20 being in the operative state which is ready to roll along the support surface 40 while supporting the item 42. At this point the individual provides the the motive force to roll the item 42 along the support surface 40 to a desired position without the requirement of lifting the item 42 by the individual or operating are making any adjustments to the retractable roller mechanism 20 itself. Next to the fifth step which is when the desired position is achieved for item 42 the individual will stop providing the motive force and the item 42 will stop at the desired position. Finally, moving to the sixth step where the item 42 is located in its desired position the weight of the item 42 is then increased which has the effect of overcoming the spring 30 bias causing the frame 24 to relatively retract into the housing 22 which in turn allows the housing 22 to rest on and statically contact the support surface 40. At this point the frame 24 is in the inoperative position state and the retractable roller mechanism 20 is in the inoperative state, providing static support for the item 42.

Conclusion

Accordingly, the present invention of a retractable roller mechanism has been described with some degree of particularity directed to the preferred embodiment of the present invention. However, a plurality of retractable roller mechanisms could be used with a wide variety of items to be supported of varying sizes and weights, while still accomplishing the desired states of statically supporting the item in an inoperative state and allowing the item to be moved along the support surface in an operative state. It should be appreciated, though, that the present invention is defined by the following claims construed in light of the prior art so that modifications or changes may be made to the exemplary embodiments of the present invention without departing from the inventive concepts contained herein.

What is claimed is:

1. A retractable roller mechanism that statically supports an item upon a support surface in an inoperative state and supports the item to roll along the support surface in an operative state, comprising:

(a) a housing having a symmetrically located axis;

(b) a wheel frame that is slidably engaged with said housing for reciprocation movement parallel to the housing axis, said reciprocation movement is relative to said housing, said frame having an inoperative position state wherein said frame is retracted such that said housing rests on and statically contacts the support surface and an operative position state wherein said frame is extended from the inoperative position state;

(c) a spring disposed between said housing and said frame to bias said frame toward the operative position state;

(d) an axle supported by said frame; and (e) a non castor wheel rotatably mounted about said axle in said frame disposed to only roll bi-directionally along the support surface when said frame is in the operative position state such that said housing is not in contact with the support surface, said wheel having a rotational axis coincident with said axle, said rotational axis perpendicular to and intersecting the housing axis.

2. A retractable roller mechanism according to claim 1 wherein said housing is adapted to attach to the item.

3. A retractable roller mechanism according to claim 1 wherein said spring has a spring strength constant "K" as measured in force per unit distance such that said frame is in the operative position state when said retractable roller mechanism is supporting the items weight and said frame is in the inoperative position state when said retractable roller mechanism is supporting a weight greater than the items weight.

4. A retractable roller mechanism according to claim 1 further including a retention shoulder disposed on said housing, said retention shoulder is functional to limit an extension movement of said frame, when said frame is in the operative position state.

5. A retractable roller mechanism that statically supports an item upon a support surface in an inoperative state and supports the item to roll along the support surface in an operative state, comprising:

(a) a housing having a symmetrically located axis, said housing including a base portion and a surrounding sidewall extending from said base portion towards the support surface to define a housing interior;

(b) a wheel frame that is slidably engaged with an interior surface of said sidewall for reciprocation movement parallel to the housing axis, said reciprocation movement is relative to said housing, said frame having an inoperative position state wherein said frame is retracted into said housing interior such that said housing rests on and statically contacts the support surface and an operative position state wherein said frame is extended from the inoperative position state;

(c) a spring disposed within said housing interior positioned between said base and said frame, said spring biasing said frame toward the operative position state;

(d) an axle supported by said frame; and (e) a non castor wheel rotatably mounted about said axle in said frame positioned to only roll bi-directionally along the support surface when said frame is in the operative position state such that said housing is not in contact with the support surface, said wheel having a rotational axis coincident with said axle, said rotational axis perpendicular to and intersecting the housing axis.

6. A retractable roller mechanism according to claim 5 wherein said frame is constructed of a bifurcated bracket straddling said wheel, said bifurcated bracket is disposed within said housing interior in the inoperative position state and in the operative position state.

7. A retractable roller mechanism according to claim 6 wherein said bifurcated bracket includes a head portion terminating into two arm portions that straddle said wheel.

8. A retractable roller mechanism according to claim 7 wherein said head portion includes a channel disposed on a periphery of said head portion, said channel is positioned to have an axis that is parallel to the housing axis.

9. A retractable roller mechanism according to claim 8 wherein said housing includes a rib disposed on said interior surface that is positioned parallel to the housing axis, said rib is slidably engaged with said channel to guide the reciprocating movement of said frame.

10. A retractable roller mechanism according to claim 5 wherein said base is adapted to be attached to the item.

11. A retractable roller mechanism according to claim 10 wherein said attachment includes a fastener.

12. A retractable roller mechanism according to claim 5 wherein said spring has a spring strength constant "K" as measured in force per unit distance such that said frame is in the operative position state when said retractable roller mechanism is supporting the items weight and said frame is in the inoperative position state when said retractable roller mechanism is supporting a weight greater than the items weight.

13. A retractable roller mechanism according to claim 12 wherein said spring is constructed of a coil spring.

14. A retractable roller mechanism according to claim 5 further including a retention shoulder disposed on said housing, said retention shoulder is functional to limit an extension movement of said frame, when said frame is in the operative position state.

15. A method of statically supporting an item upon a support surface by use of a retractable roller mechanism in an inoperative state and supporting the item to roll along the support surface by use of said retractable roller mechanism in an operative state, which comprises the steps of:

(a) providing the item to be supported;

(b) providing said retractable roller mechanism that can support the item, said retractable roller mechanism includes a housing, a wheel frame that is slidably engaged with said housing, a spring to bias and extend said frame in relation to said housing to an operative position state, an axle supported by said frame, and a non castor wheel rotatably mounted about said axle in said frame;

(c) adapting said retractable roller mechanism to support the item;

(d) rolling the item only bi-directionally along the support surface to a desired position, with said frame in the operative position state corresponding to the operative state for said retractable roller mechanism;

(e) stopping the rolling of the item at the desired position; and (f) increasing the weight of the item to overcome the spring bias to retract said frame in relation to said housing allowing said housing to rest on and statically contact the support surface to put said frame in an inoperative position state corresponding to the inoperative state for said retractable roller mechanism.

* * * * *